(12) United States Patent
Hsieh

(10) Patent No.: US 7,234,818 B2
(45) Date of Patent: Jun. 26, 2007

(54) DUST DETECTION DEVICE FOR AIR FILTER AND PROJECTOR UTILIZING THE SAME

(75) Inventor: Chia-Chang Hsieh, Tainan (TW)

(73) Assignee: BENQ Corporation, Taoyuan (TW)

( * ) Notice: Subject to any disclaimer, the term of this patent is extended or adjusted under 35 U.S.C. 154(b) by 308 days.

(21) Appl. No.: 11/016,090

(22) Filed: Dec. 17, 2004

(65) Prior Publication Data

US 2005/0134806 A1 Jun. 23, 2005

(30) Foreign Application Priority Data

Dec. 17, 2003 (TW) .............................. 92135708 A

(51) Int. Cl.
- *G03B 21/18* (2006.01)
- *G03B 21/26* (2006.01)
- *H04N 5/74* (2006.01)
- *B01D 46/00* (2006.01)
- *G01V 8/00* (2006.01)

(52) U.S. Cl. ............................ 353/57; 353/60; 353/61; 353/119; 318/280; 250/222.2; 250/239; 95/280; 348/748

(58) Field of Classification Search ................. 353/57, 353/60, 61, 119, 58; 348/748, 836; 361/230; 95/280; 318/280; 250/222.2, 239
See application file for complete search history.

(56) References Cited

U.S. PATENT DOCUMENTS

| | | | | |
|---|---|---|---|---|
| 5,762,689 | A * | 6/1998 | Hunziker | 95/280 |
| 6,364,489 | B1 * | 4/2002 | Eguchi | 353/57 |
| 6,805,446 | B2 * | 10/2004 | Arai et al. | 353/61 |
| 7,120,006 | B2 * | 10/2006 | Sekoguchi et al. | 361/230 |
| 7,161,315 | B2 * | 1/2007 | Hsu | 318/280 |
| 2004/0188598 | A1 * | 9/2004 | Kawai | 250/222.2 |

* cited by examiner

*Primary Examiner*—Melissa J Koval
(74) *Attorney, Agent, or Firm*—Thomas, Kayden, Horstemeyer & Risley

(57) ABSTRACT

A projector and a dust detection device for an air filter thereof. The projector comprises a lamp, a fan, an filter, and a dust detection device. The lamp comprises a housing with an inlet and an exit. The fan is disposed in front of the inlet of the housing, and generates airflow to dissipate heat produced by the lamp. The air filter is disposed in front of the exit of the housing, and filters the airflow passing around the lamp. The dust detection device is disposed behind the air filter, and detects the state of the filtered airflow.

18 Claims, 4 Drawing Sheets

DUST DETECTION DEVICE FOR AIR FILTER AND PROJECTOR UTILIZING THE SAME

BACKGROUND OF THE INVENTION

1. Field of the Invention

The invention relates to a projector and a dust detection device for an air filter thereof, and in particular, to a projector with an air filter that can be timely changed.

2. Description of the Related Art

In a projector, a fan provides a predetermined amount of airflow to dissipate heat from a high temperature lamp. Due to safety reasons, an air filter is additionally disposed in front of an outlet of the lamp. When the projector exposed to particulates over a long period, accumulation thereof may be great enough to reduce the airflow of the fan. As a result, the temperature of the lamp cannot be reduced normally, thus damaging the projector.

SUMMARY OF THE INVENTION

In order to address the disadvantages of the aforementioned projector, the invention provides a projector with an air filter that can be timely changed.

Another purpose of the invention is to provide a dust detection device for an air filter.

Accordingly, the invention provides a projector comprising a lamp, a fan, an air filter, and a dust detection device. The lamp comprises a first housing with an inlet and an outlet. The fan is disposed in front of the inlet to generate airflow dissipating the heat of the lamp. The air filter is disposed in front of the outlet to filter the airflow passing through the lamp. The dust detection device is disposed behind the air filter to detect the state of the filtered airflow.

In a preferred embodiment, the dust detection device comprises a rotating member and a detector. The rotating member rotates between a first position and a second position. The detector detects the state of the airflow according to position of the rotating member.

Furthermore, the detector comprises a light emitting diode, a photo transistor, and a second housing. The light emitting diode outputs a first signal. The photo transistor faces the light emitting diode to receive the first signal. When being in the second position, the rotating member is located between the light emitting diode and the photo transistor, so that the photo transistor cannot receive the first signal and thus the detector determines that the air flow is in normal state. The second housing is U-shaped, and receives the light emitting diode and the photo transistor therein.

Additionally, the dust detection device further comprises a shaft combined with the rotating member so that the rotating member rotates around the shaft. The rotating member comprises a first blade and a second blade. The first blade is connected to the rotary shaft, and extends in a first direction. The second blade is connected to the first blade, and extends in a second direction. An angle is formed between the first direction and the second direction.

In another preferred embodiment, the detector comprises a transmitter, a switch, and a receiver. When the switch is turned on, the transmitter transmits a second signal to the receiver. When the rotating member is in the second position, the switch is turned off, so that the receiver cannot receive the second signal, and thus the detector determine that the airflow is in normal state.

Moreover, the projector further comprises a case and a controller. The case comprises an exit. The airflow flows through the dust detection device before flowing to the exit. The controller is coupled to the dust detection device.

In the invention, a dust detection device for detecting passage of airflow through an air filter is provided. The dust detection device comprises a detector and a rotating member. The rotating member rotates between a first position and a second position. When the rotating member is in the second position, the detector determines that the airflow is in normal state. When the rotating member is not in the second position, the detector determines that the airflow is not in normal state.

In the invention, another projector is provided, comprising a lamp, a fan, an air filter, and a dust detection device. The lamp comprises a first housing with an inlet and an outlet. The fan is disposed in front of the inlet to generate airflow for dissipating heat produced by the lamp. The air filter is disposed in front of the outlet to filter the airflow passing around the lamp. The dust detection device detects the state of the filtered airflow. The airflow flows to the dust detection device via the air filter. The dust detection device comprises a rotating member and a detector. The rotating member rotates between a first position and a second position. The detector determines the state of the airflow according to the position of the rotating member.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
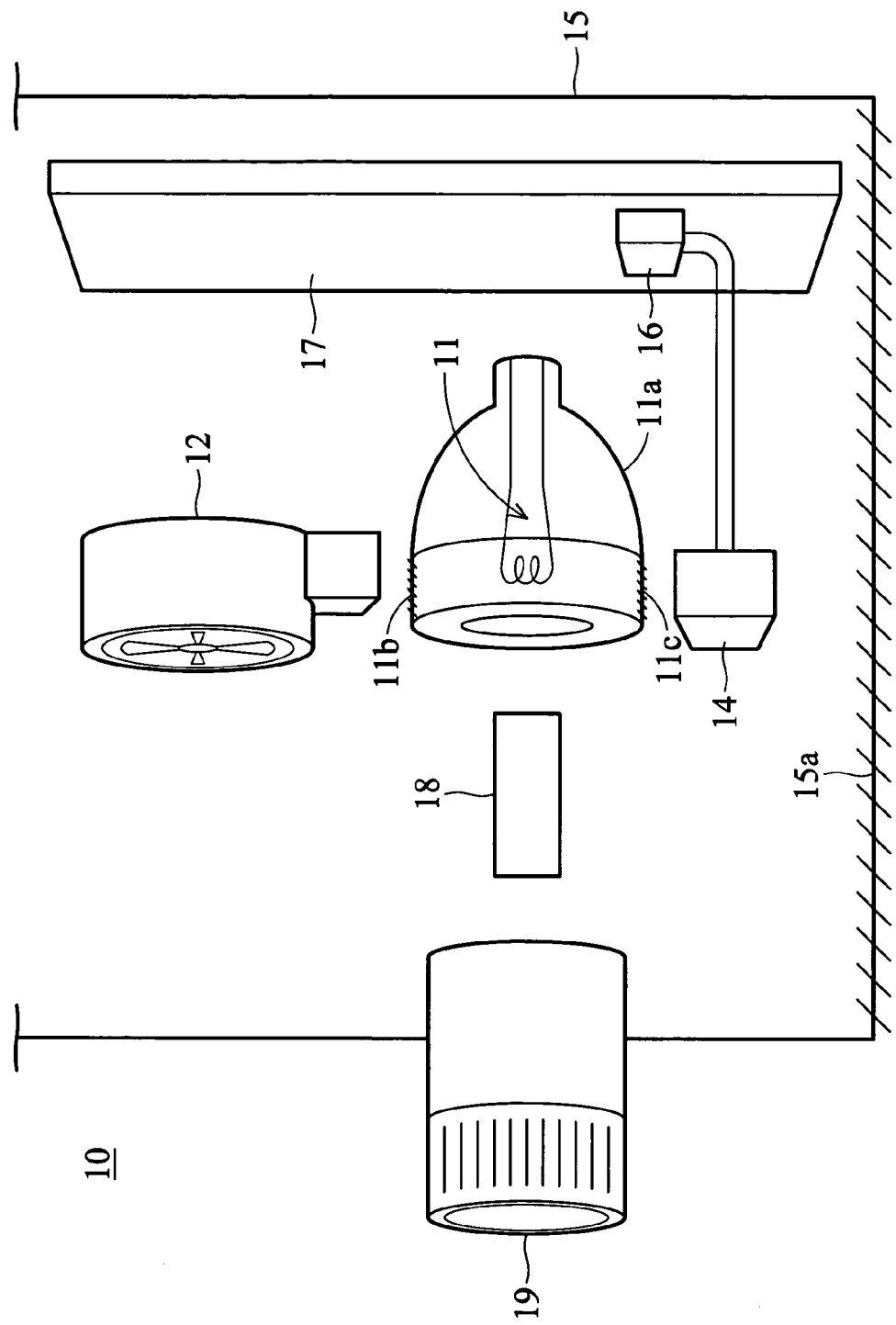
FIG. 1 is a schematic view of a projector as disclosed in the invention.

FIG. 1 is a schematic view of a projector 10 as disclosed in the invention. The projector 10 comprises a lamp 11, a fan 12, an air filter 13, and a dust detection device 14, a case 15, and a controller 16. It is understood that the projector 10 may further comprise a printed circuit board 17, a light pipe 18, and lens 19. Since the other elements are only peripherally related to this invention, their description is omitted.

Figure 2A:
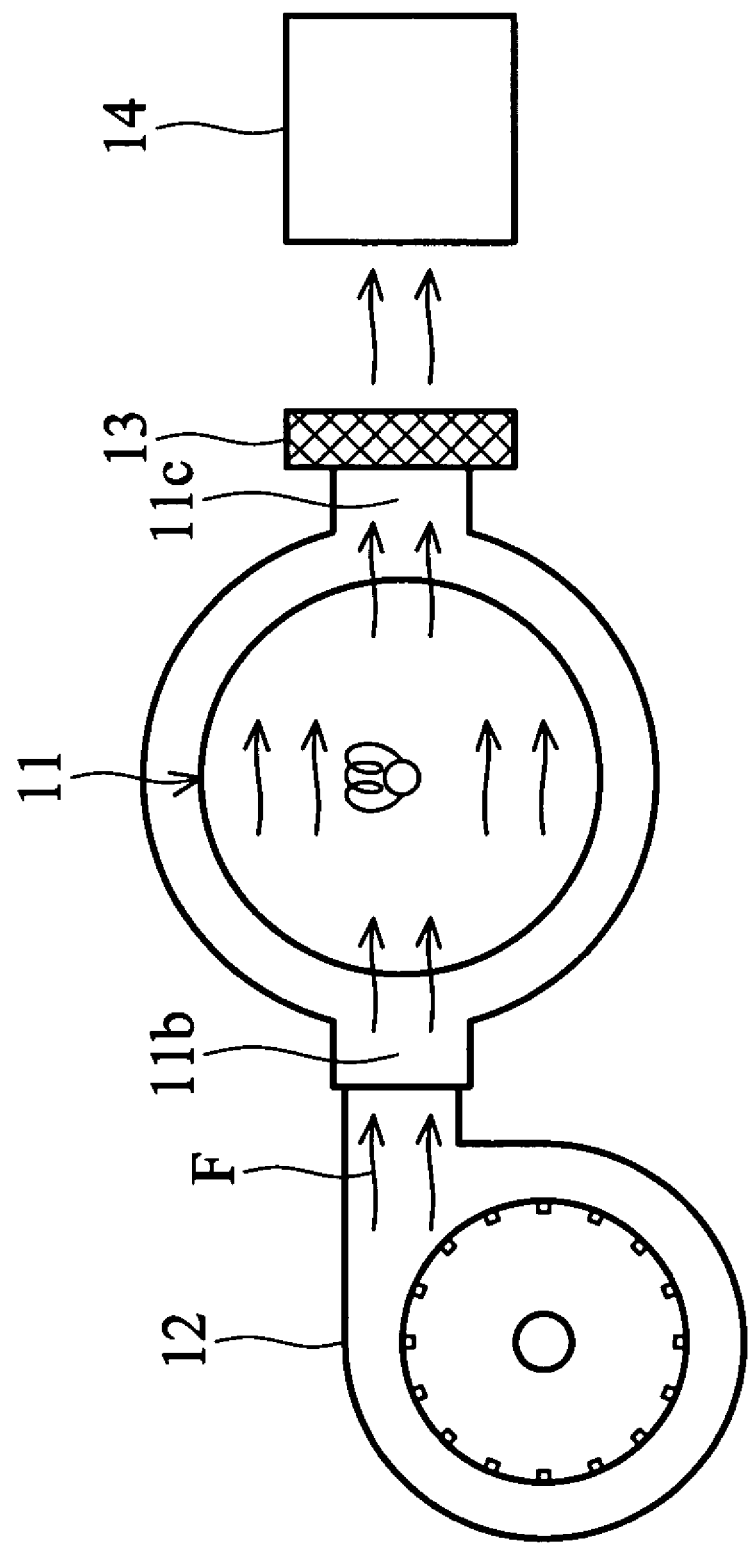
FIG. 2a is a schematic view of a fan, a lamp, an air filter, and a dust detection device in FIG. 1.

The lamp 11 comprises a first housing 11a with an inlet 11b and an outlet 11c. The fan 12 is disposed in front of the inlet 11b of the lamp 11 to generate airflow F, as shown in FIG. 2a, to dissipate heat of the lamp 11. Referring to FIG. 2a, the air filter 13 is disposed in front of the outlet 11c of the lamp 11 to filter the airflow F passing around the lamp 11.

The dust detection device 14 is disposed behind the air filter 13 to detect the state of the filtered airflow F, as shown in FIG. 2a. That is, before the airflow F flows to the dust detection device 14, it flows through the air filter 13. It is noted that the dust detection device 14 occupies a very small space so that the arrangement inside the projector 10 does not require modification. Alternatively, due to the dust detection device 14, the arrangement near the lamp 11 can be slightly adjusted for convenient assembly.

Figure 2B:
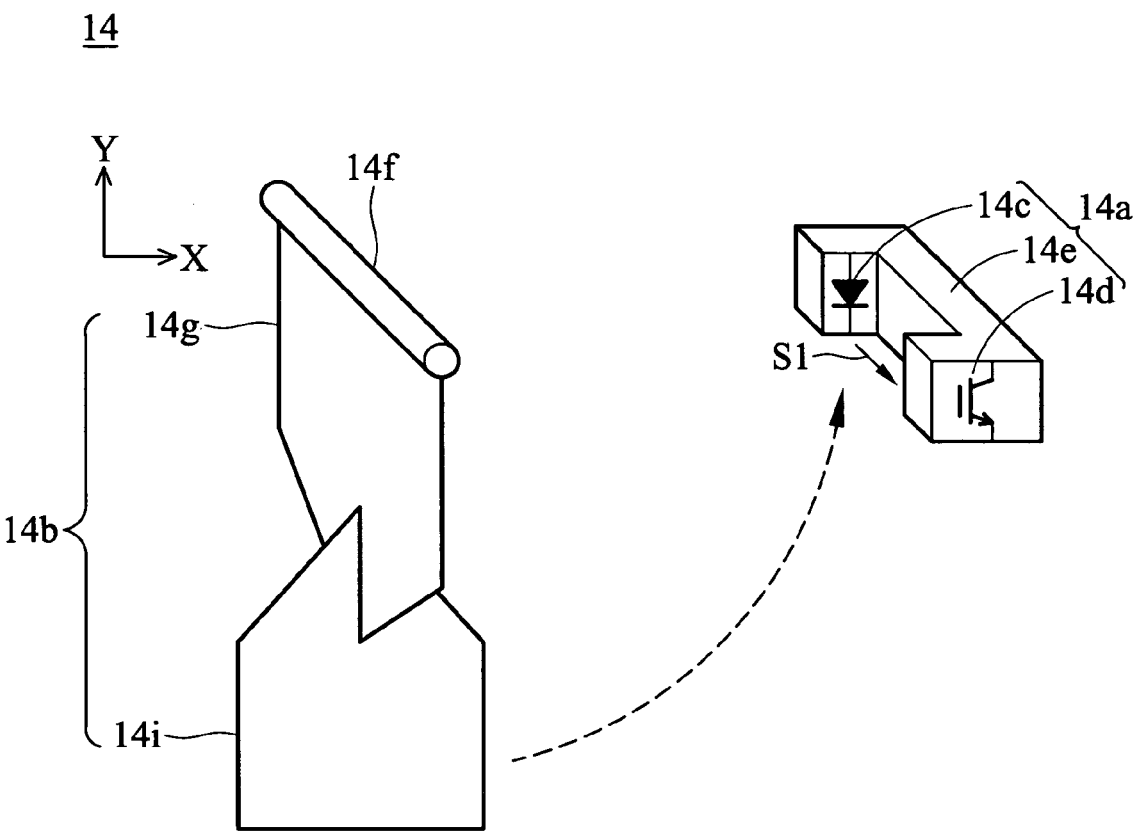
FIG. 2b is a schematic view of the dust detection device in FIG. 2a, wherein a rotating member is in a first position.
Figure 2C:
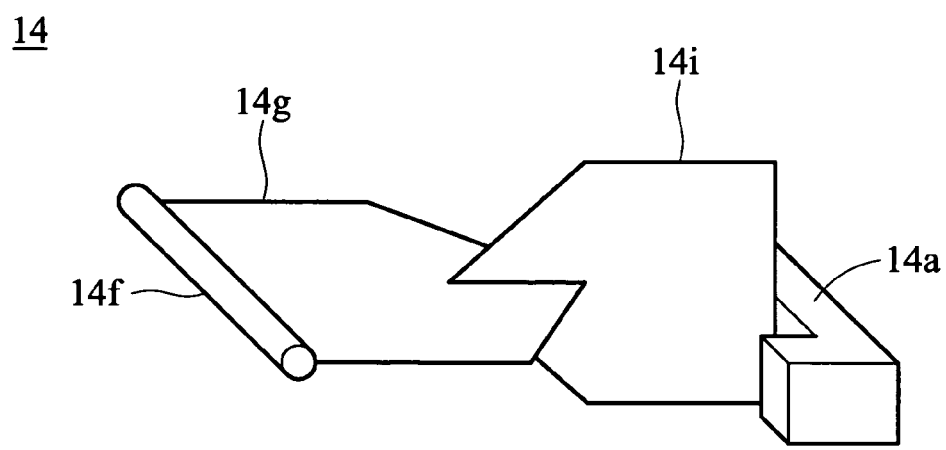
FIG. 2c is another schematic view of the dust detection device, wherein the rotating member is in a second position.

Referring to FIGS. 2b-2c, the dust detection device 14 comprises a shaft 14f, a rotating member 14b, and a detector 14a. The shaft 14f is combined with the rotating member 14b so that the rotating member 14b rotates around the shaft 14f. The rotating member 14b rotates between an initial position (shown in FIG. 2b and hereinafter referred to as a first position) and an operating position (shown in FIG. 2c and hereinafter referred to as a second position). The rotating member 14b comprises a first blade 14g and a second blade 14i. The first blade 14g is connected to the shaft 14f, and its width extends in a first direction as shown by the Y-axis in FIG. 2b. The airflow F makes the rotating member 14b rotate because of the first blade 14g. The second blade 14i is connected to the first blade 14g, and its width extends in a second direction as shown by X-axis in FIG. 2b. An angle is formed between the first direction and the second direction. In the embodiment, the second direction is substantially perpendicular to the first direction. The rotating member 14b stops the signal transmission of the detector 14a by the second blade 14i.

The detector 14a detects the state of the airflow F according to position of the rotating member 14b. Specifically, as shown in FIG. 2b, the detector 14a comprises a second housing 14e, a light emitting diode 14c, and a photo transistor 14d. The second housing 14e is U-shaped, and receives the light emitting device 14d and the photo transistor 14c therein. The light emitting diode 14c can output a first signal S1. The photo transistor 14d facing the light emitting diode 14c is capable to receive the first signal S1. When the fan 12 generates the airflow F, the rotating member 14b rotates to the second position located between the light emitting diode 14c and the photo transistor 14d. At this time, the photo transistor 14d cannot receive the first signal S1, thus determining that the airflow F is in normal state.

Referring to FIG. 1, the case 15 comprises an exit 15a. Before the airflow F flows to the exit 15a, it passes through the dust detection device 14. The controller 16 is coupled to the dust detection device 14 to detect the state of the dust detection device 14. The controller 16 can output a signal via an interface (not shown) of the projector 10 indicating that the air filter 13 requires replacement or maintenance. It is understood that the controller 16 may be disposed on an original printed circuit board 17 of the projector 10. Alternatively, the controller 16 may be an original device on the printed circuit board 17 with additional functions.

Referring to FIG. 2b, when the projector 10 is turned off, the second blade 14i of the rotating member 14b does not shield the detector 14b regardless of the position of the projector 10. In a normal situation, when the projector 10 is turned on, the airflow F rotates the first blade 14g of the rotating member 14b to the second position as shown in FIG. 2c. Thus, the first blade 14i is in the second housing 14e of the detector 14a so that the photo transistor 14d cannot receive the first signal S1 from the light emitting diode 14c. As a result, the normal airflow can be acknowledged, and the projector 10 is also acknowledged to be operating in a normal state.

When particulate accumulation on the air filter 13 exceeds a predetermined level, the airflow F is reduced so that the rotating member 14b cannot be rotated to the second position. In this situation, since the second blade 14i doesn't shield the detector 14a, the photo transistor 14d receives the first signal S1 from the light emitting diode 14c so that the controller 16 can acknowledge the change of the detector 14a. The controller 16 informs the user via the interface that the airflow is insufficient due to excessive particulate accumulation on the air filter indicated that the air filter must be replaced or cleaned.

By adding the dust detection device 14 in the projector 10, the air filter can be replaced or cleaned in a timely manner, thus extending the lifetime of the lamp.

Figure 3A:
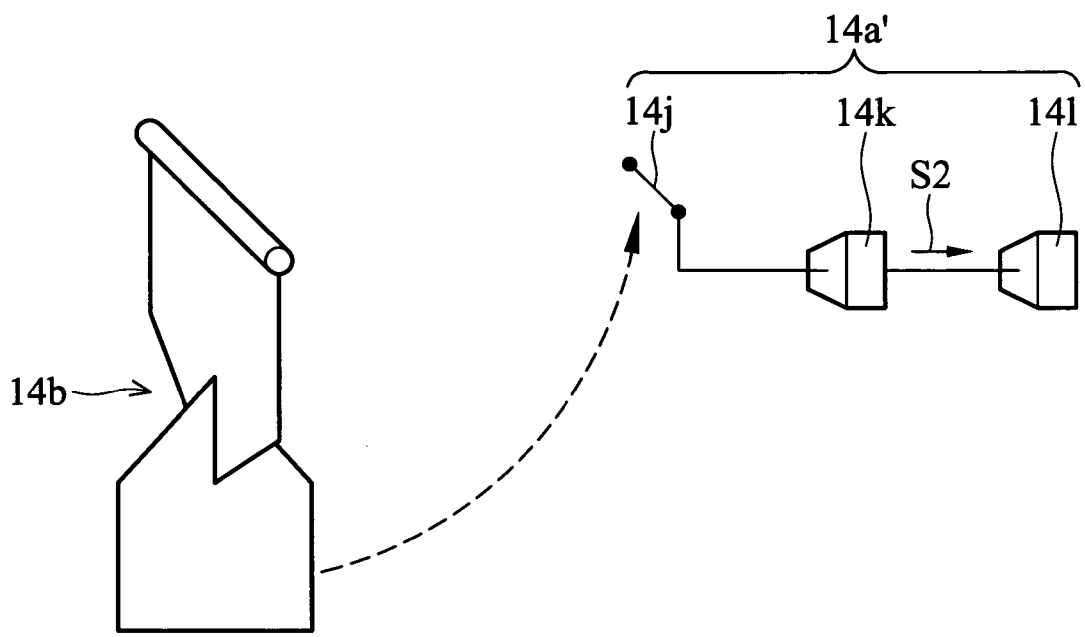
FIG. 3a is a schematic view of a variant embodiment of a detector, wherein the rotating member is in the first position.
Figure 3B:
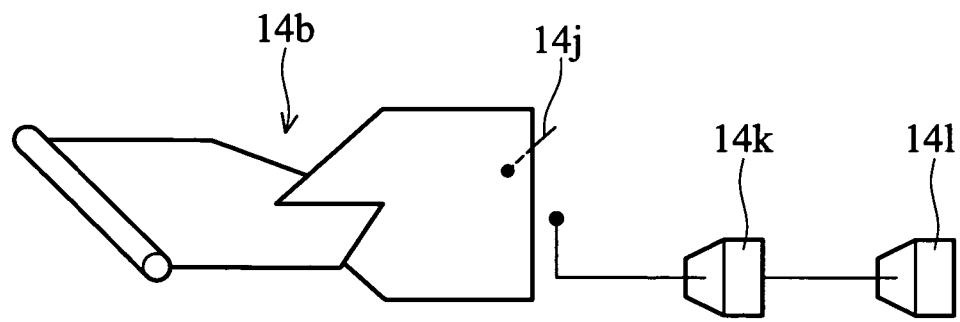
FIG. 3b is a schematic view of the detector in FIG. 3a, wherein the rotating member is in the second position.

Additionally, it is understood that the detector is not limited to the above structure. For example, as shown in FIGS. 3a-3b, the detector 14a' may comprise a transmitter 14k, a switch 14j, and a receiver 14l. When the projector 10 is turned off, the rotating member 14b is in the first position as shown in FIG. 3a. At this time, the switch 14j is turned on, and the transmitter 14k transmits a second signal S2 to the receiver 14l. When projector 10 operates in a normal situation, the rotating member 14b is in the second position so that the switch 14j is turned off. Thus, the transmitter 14k cannot output the second signal S2 to the receiver 14l, thus determining that the airflow F is in normal state.

While the invention has been described by way of example and in terms of the preferred embodiment, it is to be understood that the invention is not limited to the disclosed embodiment. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A projector comprising:
    a lamp comprising a first housing with an inlet and an outlet;
    a fan disposed in front of the inlet to generate airflow to dissipate heat produced by the lamp;
    an air filter disposed in front of the outlet to filter the airflow passing around the lamp; and
    a dust detection device disposed behind the air filter to detect the state of the filtered airflow, wherein the dust detection device comprises:
    a rotating member rotating between a first position and a second position; and
    a detector for detecting the state of the airflow according to position of the rotating member.

2. The projector as claimed in claim 1, wherein the detector comprises:
    a light emitting diode outputting a first signal; and
    a photo transistor facing the light emitting diode to receive the first signal;
    wherein when being in the second position, the rotating member is located between the photo transistor and the light emitting diode, so that the photo transistor cannot receive the first signal and thus the detector determines that the airflow is in normal state.

3. The projector as claimed in claim 2, wherein the detector further comprises a second housing to receive the light emitting diode and the photo transistor therein.

4. The projector as claimed in claim 3, wherein the second housing is U-shaped.

5. The projector as claimed in claim 1, wherein the dust detection device further comprises a shaft combined with the rotating member so that the rotating member rotates around the shaft.

6. The projector as claimed in claim 5, wherein the rotating member comprises:
   a first blade, connected to the shaft, the first blade extending in a first direction; and
   a second blade, connected to the first blade, the second blade extending in a second direction, wherein an angle is formed between the first direction and the second direction.

7. The projector as claimed in claim 1, the detector comprising a transmitter, a switch, and a receiver;
   wherein when the switch is turned on, the transmitter transmits a second signal to the receiver, and
   when the rotating member is in the second position, the switch is turned off, so that the receiver cannot receive the second signal, and thus the detector determines that the airflow is in normal state.

8. The projector as claimed in claim 1, further comprising a case comprising an exit, wherein the airflow flows through the dust detection device before flowing to the exit.

9. The projector as claimed in claim 1, further comprising a controller coupled to the dust detection device.

10. A dust detection device for detecting airflow passing through an air filter, comprising:
    a detector comprising a light emitting diode outputting a first signal and a photo transistor facing the light emitting diode to receive the first signal; and
    a rotating member rotating between a first position and a second position, wherein when being in the second position, the rotating member is located between the photo transistor and the light emitting diode, so that the photo transistor cannot receive the first signal and thus the detector determines that the airflow is in normal state, and when being not in the second position, the detector determines that the airflow is not in normal state.

11. The dust detection device as claimed in claim 10, wherein the detector further comprises a second housing to receive the light emitting diode and the photo transistor therein.

12. The dust detection device as claimed in claim 10, further comprising a shaft combined with the rotating member so that the rotating member rotates around the shaft.

13. The dust detection device as claimed in claim 12, wherein the rotating member comprises:
    a first blade, connected to the shaft, the first blade extending in a first direction; and
    a second blade, connected to the first blade, the second blade extending in a second direction, wherein an angle is formed between the first direction and the second direction.

14. The dust detection device as claimed in claim 10, further comprising a controller coupled to the detector.

15. A projector comprising:
    a lamp including a first housing with an inlet and an outlet;
    a fan disposed in front of the inlet to generate airflow to dissipate heat produced by the lamp;
    an air filter disposed in front of the outlet to filter the airflow passing around the lamp; and
    a dust detection device for detecting the state of the filtered airflow, wherein the airflow flows to the dust detection device via the air filter;
    wherein the dust detection device comprises:
    a rotating member rotating between a first position and a second position; and
    a detector for detecting the state of the airflow according to position of the rotating member.

16. The projector as claimed in claim 15, wherein the detector comprises:
    a light emitting diode outputting a first signal; and
    a photo transistor facing the light emitting diode to receive the first signal;
    wherein when being in the second position, the rotating member is located between the photo transistor and the light emitting diode, so that the photo transistor cannot receive the first signal and thus the detector determines that the airflow is in normal state.

17. The projector as claimed in claim 16, wherein the dust detection device further comprises a shaft combined with the rotating member so that the rotating member rotates around the shaft.

18. The projector as claimed in claim 17, wherein the rotating member comprises:
    a first blade, connected to the shaft, the first blade extending in a first direction; and
    a second blade, connected to the first blade, the second blade extending in a second direction, wherein an angle is formed between the first direction and the second direction.

* * * * *